(No Model.)
T. LOVEDAY.
HORSE COLLAR.
No. 288,248. Patented Nov. 13, 1883
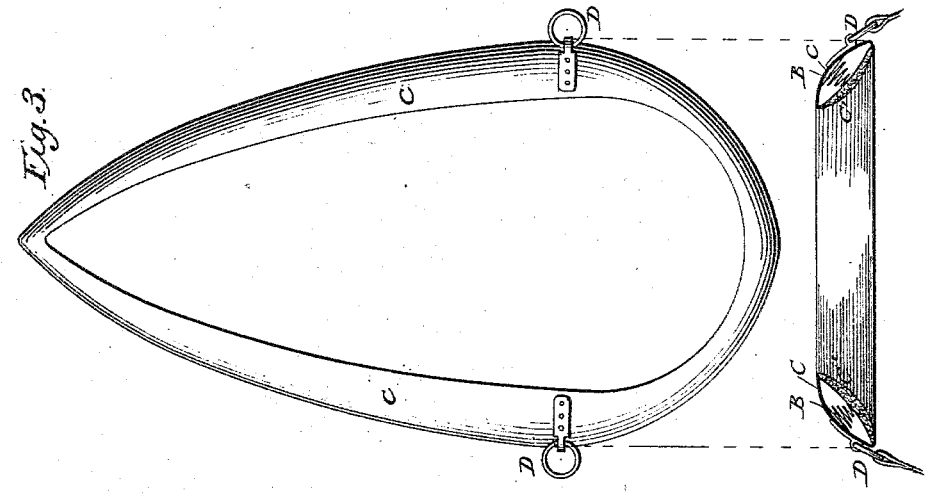
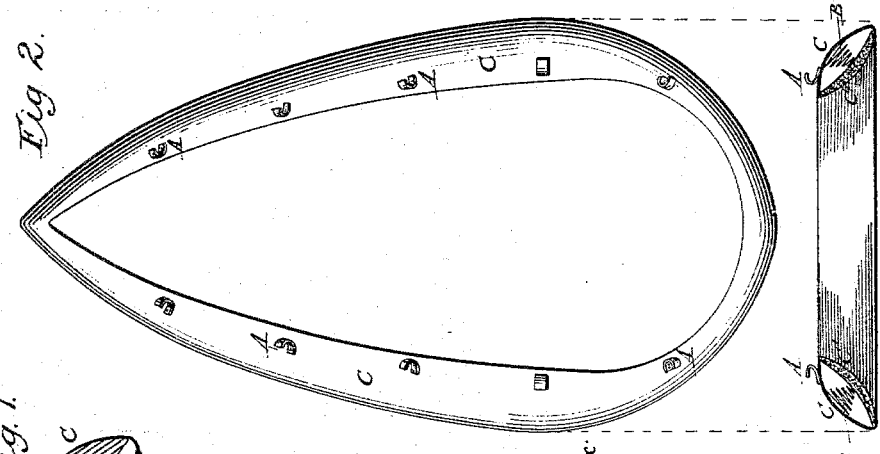
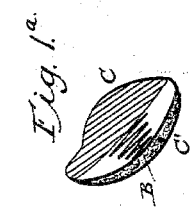
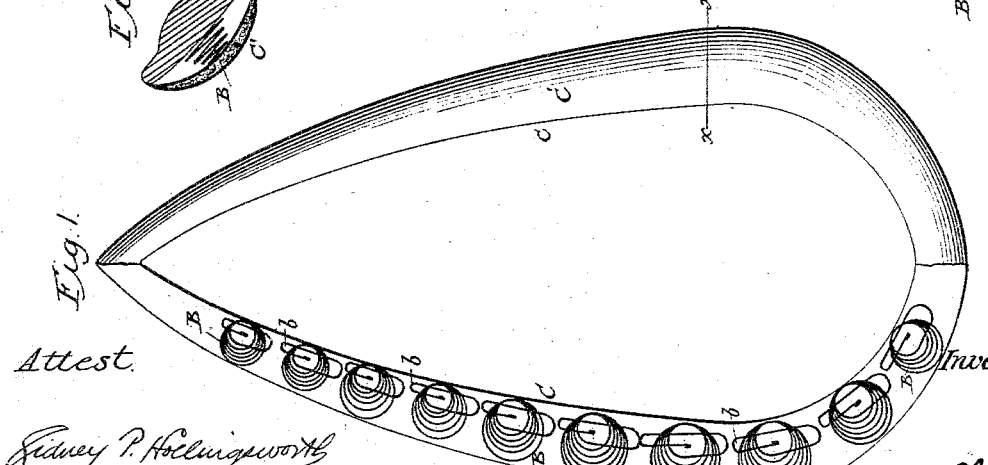
Attest.
Sidney P. Hollingsworth
Harry Shipley
Inventor.
Thomas Loveday
By P. T. Dodge
atty.

UNITED STATES PATENT OFFICE.

THOMAS LOVEDAY, OF ISLIP, COUNTY OF NORTHAMPTON, ENGLAND.

HORSE-COLLAR.

SPECIFICATION forming part of Letters Patent No. 288,248, dated November 13, 1883.

Application filed June 26, 1882. (No model.) Patented in England December 14, 1881, No. 5,471.

*To all whom it may concern:*

Be it known that I, THOMAS LOVEDAY, of Islip, in the county of Northampton, England, have invented certain new and useful Improvements in Horse-Collars, of which the following is a specification.

The object of my invention is to provide a horse-collar which may be more cheaply constructed than those made in the ordinary manner, and which shall adapt itself easily and uniformly to the animal.

My collar is susceptible of modification in its minor features; but in each instance it will consist of a rigid frame or body provided on the rear side with a series of spiral springs, the rear ends or bases of which are made of an elongated instead of a circular form, whereby they are adapted to co-operate and produce a narrow elastic surface at the rear side of the collar, their elongated ends coming nearly in contact with each other, so that they give to the surface of the collar a practically continuous support. I have represented in the accompanying drawings the springs as constructed and arranged in connection with frames of different forms.

Another feature of my invention consists in combining the spiral springs with a metallic frame constructed in the peculiar manner hereinafter described.

Referring to the accompanying drawings, Figure 1 is an elevation, partially in section, of a collar containing certain of my improvements, the frame or body being made of straw. Fig. 1ª is a cross-section of the same on the line *x x*. Fig. 2 is an elevation in cross-section of the collar in a modified form, my improved springs, as in the preceding figure, being used in connection with a metallic frame. Fig. 3 represents in elevation and cross-section the collar in another of its forms, the springs being the same as in the two preceding figures and the draft devices slightly modified.

Referring to Fig. 1, C represents the body of the collar, composed of quilted straw, provided, as usual, with a forewale to hold the hames, this forewale being of ordinary form, well understood by all persons skilled in the art. To the rear side of the body I affix a series of spiral springs, B, over which I apply, as shown in the drawings on the right-hand side of the figure, a covering of leather or other suitable elastic material, C', which may be padded or upholstered, if desired. As clearly shown in Fig. 1, each spring has its rear end flattened or contracted in one direction, but elongated in the other. By this departure from the circular form I am enabled to bring the ends of the springs close together and to give them a narrow bearing, so that the end of the collar while receiving a continuous support throughout its length may be made with a narrow edge. Were the springs made of circular form at the rear ends, and of sufficient size to touch each other at the periphery, they would render the collar clumsy and unwieldy, but by their elongation in the manner described and shown this difficulty is entirely avoided. This peculiar characteristic of the springs will be found to exist in each of the three forms of springs represented in the drawings, and constitutes a feature of novelty in each of the various figures.

In Fig. 2 the frame or body, instead of being composed of straw, is made of thin polished sheet metal, having, as shown, a form or contour somewhat similar to that of the front of an ordinary collar. Against or within the rear concave side of this frame I seat the series of spiral springs, constructed as before described and shown, and over these springs I place an elastic packing, as in the first figure. This covering, which will be attached at its edges to the edges of the frame, may be padded or upholstered, if desired, to give additional stiffness to the collar.

For the purpose of retaining the hames I provide the metal frame with projections A, riveted thereon, these projections taking the place of and being an equivalent for the usual forewale shown in the first figure.

In the collar represented in Fig. 3 the frame is constructed in all respects in the same manner as that illustrated in the preceding figure, with the single exception that the projections A are replaced by plates having loose rings D attached thereto to receive the draft devices.

I do not claim, broadly, the combination of spiral springs with a horse-collar; nor do I claim, broadly, a horse-collar having a metallic frame.

Having thus described my invention, what I claim is—

1. In a horse-collar, the combination of a supporting-frame, a series of spiral springs having elongated rear ends, and a covering of flexible material applied over said ends and secured to the edges of the frame.

2. The improved collar consisting of the sheet-metal frame, the spiral springs seated in the rear concave side of said frame, and the flexible covering applied over said springs and secured to the edges of the frame.

3. The combination of the sheet-metal frame, the spiral springs, the flexible covering for said springs, and the draft-receiving devices secured to the metal frame.

THOMAS LOVEDAY.

Witnesses:
WM. P. THOMPSON,
J. OWDEN O'BRIEN.